United States Patent [19]
Rohner

[11] 3,780,272
[45] Dec. 18, 1973

[54] ELECTRONIC ODOMETER AND COMPARATIVE RATE INDICATOR

[76] Inventor: Thomas E. Rohner, 717 N. Park, West Liberty, Iowa 52776

[22] Filed: Oct. 10, 1972

[21] Appl. No.: 296,198

Related U.S. Application Data

[63] Continuation-in-part of Ser. No. 194,725, Nov. 1, 1971, abandoned.

[52] U.S. Cl............................ 235/150.2, 235/95 R
[51] Int. Cl............................................ G01c 22/02
[58] Field of Search................... 235/150.2, 151.32, 235/92 MT, 92 DN, 95 R, 96, 97; 33/142; 73/490

[56] References Cited
UNITED STATES PATENTS

| | | | |
|---|---|---|---|
| 3,253,254 | 5/1966 | Buhler | 235/92 MT X |
| 3,637,996 | 1/1972 | Seymour | 235/92 DN X |
| 3,659,780 | 5/1972 | Woodward | 235/95 R |
| 3,715,572 | 2/1973 | Bennett | 235/150.2 |

*Primary Examiner*—Malcolm A. Morrison
*Assistant Examiner*—David H. Malzahn
*Attorney*—Glenn H. Antrim et al.

[57] ABSTRACT

An impulse generator coupled to a road wheel provides pulses to the input of a divider, and pulses are supplied from the divider to a counter for storing coded signals indicating the distance traveled on a trip. An oscillator supplies signals through a logic array to another counter for storing additional signals corresponding to the desired distance for the elapsed time. The signals are compared to provide the difference between the two stored distances, and means are provided for selectively displaying actual distance, desired distance, or their difference.

10 Claims, 1 Drawing Figure

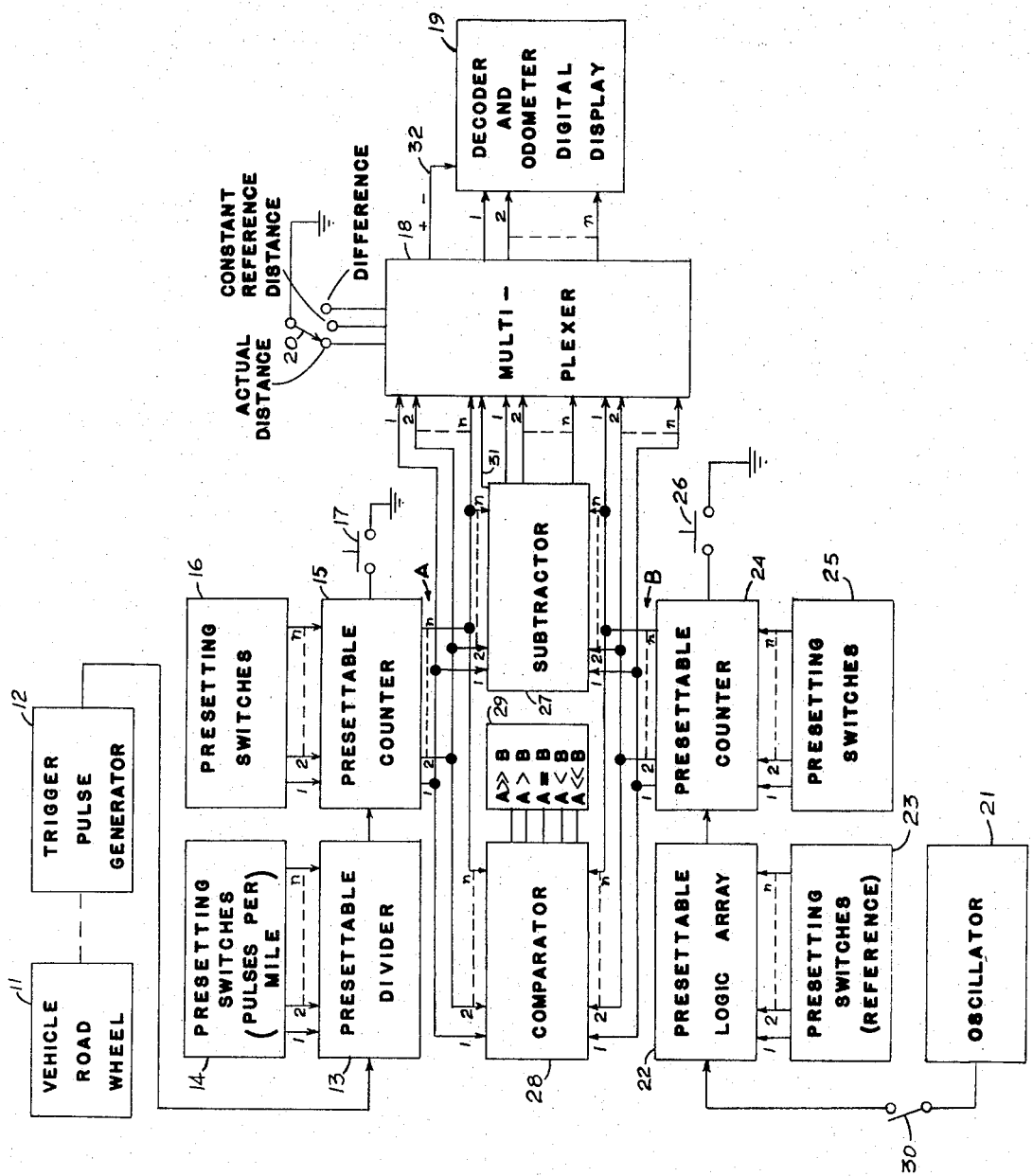

ELECTRONIC ODOMETER AND COMPARATIVE RATE INDICATOR

This is a continuation-in-part of Application Ser. No. 194,725, filed Nov. 1, 1971 now abandoned.

BACKGROUND OF THE INVENTION

This invention relates to odometers for road vehicles and particularly to odometers that are electrically operated and can be controlled to display either actual distance traveled at a particular time or desired distance to be traveled at that time.

Mechanically operated odometers, especially those in severe service such as those on racing cars, often require repair to maintain them in operation. Another disadvantage is that mechanically operated odometers can not usually be readily transferred from one type of vehicle to another.

In U.S. Pat. No. 3,233,827 issued to T.A. Byles on Feb. 8, 1966, a mechanical display device is connected to a road wheel by an electrical circuit. An armature of a solenoid is operated by a cam coupled to the wheel to change its air gap rapidly once during each revolution of the wheel. Electrical pulses are thereby formed in the solenoid and are applied to the input control circuit of a transistor. The transistor becomes momentarily conductive in response to the application of each pulse to operate a solenoid actuator. The armature of the actuator is connected to a mechanical counter to advance the counter as each pulse is generated.

SUMMARY OF THE INVENTION

The odometer of the present invention is namely electronic; the only mechanical connection is the connection or coupling to a road wheel of a vehicle for operating an input, trigger, pulse generator. In both the present application and its parent Application Ser. No. 194,725, electronic circuits are provided to display selectively actual trip distance traveled by a vehicle and a desired distance since the beginning of a trip. The arrangement described in the present application also provides circuits for continually comparing the actual distance and the desired distance and for selectively displaying the difference therebetween.

For displaying actual distance, the circuit includes a trigger or pulse generator coupled to a road wheel, a presettable divider, a presettable counter, a decoder, and an electronic, digital display device connected in cascade. For displaying desired distance, an oscillator operating at a constant frequency is substituted for the pulse generator that is connected to a road wheel. The present circuit has a separate divider and a separate counter connected to the oscillator so that digital coded information for both actual distance and desired distance are stored simultaneously and are continually available for display. In addition to the connections for displaying stored distances, the outputs of the counters are connected to a comparator, and the comparator can be selectively connected to the display device to indicate the difference between the actual distance and the desired distance. An indicator connected to the comparator shows which distance is the greater.

The odometer is reliable and readily adjustable to different vehicles. The divider that is connected to the trigger pulse generator is set according to the outside diameter of the road wheel from which input pulses are being derived. Therefore, the odometer can be changed from one type of vehicle to another and set to display distance accurately.

BRIEF DESCRIPTION OF THE DRAWING

The single FIGURE is a block diagram of the odometer of this invention for displaying actual distance, desired distance, and the difference therebetween.

DESCRIPTION OF THE PREFERRED EMBODIMENT

The input to the channel for measuring actual distance has an input connected to the road wheel 11. In one embodiment, a cam is mounted on the hub of the road wheel, and a microswitch is mounted with its follower in contact with the cam. The switch is operated between a closed and an open position during each revolution of the wheel and provides a pulse to a trigger pulse generator 12. Alternately, a magnet may be secured to the hub, and a trigger voltage generated in a metallic pickup as the magnet passes it. Either a pickup for developing voltage by magnetic induction or a pickup responsive to the Hall effect may be used.

The output of the pulse generator 12 is connected to the input of a presettable divider 13. For adjusting the divider according to the diameter of the tire of the road wheel, presetting switches 14 are connected to conductors 1-n to presetting circuits of the divider 13. The presetting switches 14 are adjusted to provide the correct ratio between the number of output pulses of the divider 13 and the number of the input pulses. When the ratio is correct, the distance traveled by the vehicle on a trip is correctly displayed.

The output of the presettable divider 13 is connected to the input of a presettable counter 15; the counter is operated at the rate determined by the speed of rotation of the vehicle road wheel 11. In order that the counter 15 can be set at any time to adjust the display on the odometer to a known position on a course, presetting switches 16 are connected through conductors 1–n to the control circuits of the counter 15, and a reset switch 17 connected in a usual manner is provided. The presetting switches 16 can be set so that any desired number at a particular time can be stored in the counter 15, the desired number being stored when the reset switch 17 is pressed to close a reset circuit. The output of the presettable counter 15 in coded form is applied through conductors 1–n to the input of a multiplexer 18. The multiplexer 18 transfers a selected input coded signal to a decoder and digital display device 19. Which one of three different coded signals applied to the input of the multiplex is to be supplied to the digital display 19 is determined by the position of a three-position switch 20 connected to the multiplexer 18. When the switch is operated to a first position, the signal from the counter 15 is applied to the decoder and odometer digital display 19 where it is decoded and displayed digitally to show the actual distance traveled by the vehicle on a trip.

The present preferred embodiment has a second channel as described in detail below for storing in a second counter a desired distance to be traveled at a predetermined rate. In a simpler embodiment that does not provide as much information as the preferred embodiment shown in the accompanying drawing, a single channel is used, and the output of the counter 15 is connected directly to the decoder and display device 19. The output of an oscillator, like the oscillator 21 described below, and the output of the trigger pulse generator 12 may be connected through a two-position selector switch so that either output can be selectively applied to the input of the presettable divider 13. When the selector switch (not shown) is in the position for connecting the output of the oscillator, the desired distance is stored in the counter 15 in the same manner that it is stored in the counter 24 according to the embodiment shown in the accompanying drawing.

When a separate channel for storing desired distance is provided, an oscillator 21 is connected through a switch 30 to the input of the channel. In a preferred embodiment, the frequency of the oscillator 21 is 0.277 Hertz. Presetting switches 23 are connected through conductors 1-n to the logic array 22 to set it for providing a desired ratio between the number of output pulses and the number of input pulses. This ratio is determined according to a desired rate. The output of the logic array 22 is connected to the input of a presettable counter 24 that is similar to the presettable counter 15, and presetting switches 25 are connected to the counter 24 to set it in the same manner that the presetting switches 16 set the presettable counter 15. The presetting switches 25 are conveniently thumb-controlled switches that can be set at any desired number representing a particular distance, and the number is transferred to the counter 24 when a reset switch 26 that corresponds to the reset switch 17 is operated. The coded output of the presettable counter 24 is connected to input circuits of the multiplexer 18, and when the selector switch 20 is operated to a second position, desired distance for elapsed time is displayed on the digital display device 19.

In addition to being connected directly to the multiplexer 18, the output of each of the counters 15 and 24 is connected to separate inputs of a comparator 28 and a subtractor 27. Coded output of the subtractor is connected to third input connections of the multiplexer 18, and when the selector switch 20 is in a third position, the digital display device 19 displays the difference between the actual distance stored in the counter 15 and the desired distance stored in the counter 24. A "+" or a "−" signal for showing whether the number A, stored in the counter 15, is greater or smaller respectively than the number B, stored in the counter 24, is generated in the subtractor 27, and when the switch 20 is in its third position, the signal is applied through the conductor 31, the multiplexer 18, the conductor 32 to the display device 19. Accordingly, a "+" or "−" indication is displayed with the number that is the difference between the numbers stored in the counters 15 and 24, the positive sign being shown when the number in the counter 15 is greater than the number in the counter 24, and the negative sign being shown when the number in the counter 24 is the greater.

The relative sizes of the numbers A and B are shown on an indicator 29 connected to the output of the comparator 28. Five indicator lights may be supplied on the indicator 29 to show whether number A is much greater than the number B, is greater than B, is equal to B, is less than B, or is much less than B.

Each of the electrical circuit assemblies represented by the separate block in the accompanying diagram is commercially available in an integrated circuit assembly. The signals in the counters and the multiplexer are usually in binary form. The decoder and odometer digital display device 19 may be digital electron tubes or light-emitting diodes contained in a unit such as the ones presently used in the cockpit of commercial aircraft.

The odometer of this invention can be readily adjusted for adaptation to various types of vehicles. According to a model of the odometer to which one impulse is supplied for each revolution of the vehicle road wheel, a dividend of 2,016 is divided by the outside diameter of the wheel to provide a number that is set on the presetting switches for determining the ratio between the number of pulses at the output of the divider 13 and the number of pulses applied to its input from the road wheel. The odometer will now accurately display the actual distance traveled by the vehicle. The smallest increment of distance to be read accurately on the odometer display is dependent upon the number of equally-spaced pulses generated per revolution of the road wheel 11 and the setting of the divider 13. In the present example, distance is measured in 0.1-mile increments. Should the distance measured by the odometer at some point in the trip be wrong because of human error, the correct distance can be set on the presetting switches 16, and the resetting switch 17 can be operated momentarily to reset the counter 15 to the number set on the switches 16. As long as the selector switch 20 is in its first position, coded signal from the counter 15 will be applied through the multiplexer 18 to the display device 19 for reading the actual distance.

At the starting time of a trip, the oscillator 21 is enabled by closing a suitable switch as represented by the switch 30 to provide pulses to the logic array 22. Previously, the presetting switches 23 have been set according to a desired rate of travel, and also the presetting switches 25 have been set at zero or a desired starting number, and the reset switch 26 has been operated momentarily to preset the counter 24 at the reading shown on the switches 25. During the trip, the selector switch 20 is operated as desired to provide on the display device 19 the actual distance at any particular time, the desired or reference distance, or the difference between the actual distance stored in the counter 15 and the desired distance stored in the counter 24. The comparator also functions to indicate which stored distance is the greater.

I claim:

1. An odometer having a pulse generator, a pulse ratio transformative circuit, and a first pulse counter connected in cascade, said pulse generator having a trigger input adapted to be coupled to the road wheel of a vehicle such that the rate of pulses supplied by said pulse ratio transformative circuit is a direct linear function of the rate of rotation of said road wheel, said pulse ratio transformative circuit providing to said first pulse counter electrical pulses at a rate equal to the rate at which pulses are supplied by said pulse generator divided by a predetermined constant, said first pulse counter providing output coded signals according to the distances traveled by said road wheel, a decoder and odometer display device, means connecting said first pulse counter to said decoder and odometer display device, said decoder and odometer display device responding to application of said coded signals to display digits indicating the actual distances traveled by said road wheel at particular times.

2. An odometer as claimed in claim 1 wherein said ratio transformative circuit is a pulse divider, first presetting switch means connected to said divider, said first presetting switch means being set according to the diameter of said road wheel to provide correct distance readings on said decoder and odometer display device.

3. An odometer as claimed in claim 2 having second presetting switch means connected to said first pulse counter, said second presetting switch means being operable to set said first pulse counter to provode coded signals corresponding to selected actual distances.

4. An odometer as claimed in claim 1 having coded counter means operable at a constant rate and means for connecting said counter means to said decoder and odometer display device for displaying desired distances.

5. An odometer as claimed in claim 4 wherein said coded counter means includes an oscillator, a logic array and a second pulse counter connected in cascade, means for controlling application of pulses from said oscillator to said logic array, said logic array determining the ratio between the rate of the pulses applied from its output to said second pulse counter and the rate of the pulses applied from said oscillator to the input of said logic array, said means connecting said first pulse generator to said decoder and odometer display device and said means for connecting said counter means comprising a multiplexer switching device having first input circuits connected to said first pulse counter, second input circuits connected to said second pulse counter, and output circuits connected to said decoder and odometer display device, and means for controlling said multiplexer switching device to operate it in first and second modes for applying selectively coded output from said first and second counters respectively to said decoder and odometer display device.

6. An odometer as claimed in claim 5 wherein said logic array is presettable, and third presetting switch means connected to said logic array and operable to different settings for determining the ratio between the rate of the pulses supplied to said second pulse counter and the rate of the pulses in the output of said oscillator, said last mentioned ratio determining said constant rate.

7. An odometer as claimed in claim 6 having fourth presetting switch means connected to said second pulse counter, said fourth presetting switch means being operable to set said second pulse counter to provided coded output corresponding to a selected desired distance.

8. An odometer as claimed in claim 5 having a comparator, said comparator having first and second input circuits connected to the outputs of said first and second pulse counters respectively, an indicator connected to the output of said comparator, said indicator showing which of said counters is storing the larger number.

9. An odometer as claimed in claim 5 having a subtractor, said subtractor having first and second input circuits and a coded output circuit, said first and second input circuits of said subtractor being connected to the outputs of said first and second pulse counters respectively, said multiplexer switching device having third input circuits connected to said coded output circuit of said subtractor, and said means for controlling said multiplexer switching device being operable to a third position to operate said multiplexer in a third mode for applying coded output from said subtractor to said decoder and odometer display device, said decoder and odometer display device operating in response to application of signals from said subtractor to display the difference between the actual distance stored in said first pulse counter and the desired distance stored in said second pulse counter.

10. An odometer as claimed in claim 9 wherein said subtractor has an output upon which is applied different signals according to whether the signal in the output of said first counter represents a number larger or smaller than the number corresponding to the signal in the output of said second counter, said last-mentioned output of said subtractor being connected to said decoder and odometer display device through said multiplexer switching device while said multiplexer switching device is operating in said third mode, said decoder and odometer display device having a "+" and "−" indicator operated according to the signal applied from said last-mentioned output of said subtractor.

* * * * *